(12) United States Patent
Park

(10) Patent No.: US 6,801,838 B2
(45) Date of Patent: Oct. 5, 2004

(54) DEVICE AND METHOD FOR CONVERTING VEHICLE SPEED SIGNALS

(75) Inventor: Sang Bock Park, Kwangyok (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/273,564

(22) Filed: Oct. 18, 2002

(65) Prior Publication Data

US 2003/0078702 A1 Apr. 24, 2003

(30) Foreign Application Priority Data

Oct. 19, 2001 (KR) .......................................... 2001-64717

(51) Int. Cl.[7] .............................................. B60Q 1/00
(52) U.S. Cl. .............................. 701/1; 701/93; 701/104; 340/441; 340/466; 340/815.65; 702/96; 324/166
(58) Field of Search .............................. 701/93, 104, 1; 340/461, 438, 428, 439, 458, 815.65, 815.66, 466, 441, 444; 702/96, 75; 324/166, 161, 163, 168, 178, 160

(56) References Cited

U.S. PATENT DOCUMENTS

| | | | | |
|---|---|---|---|---|
| 4,380,733 A | * | 4/1983 | Yano et al. ................. | 324/166 |
| 4,434,470 A | * | 2/1984 | Thomas et al. ............. | 324/166 |
| 4,803,646 A | * | 2/1989 | Burke et al. ................ | 73/490 |
| 5,103,413 A | * | 4/1992 | Ohata .......................... | 702/96 |
| 5,357,451 A | * | 10/1994 | Beaudry et al. ............. | 324/166 |
| 5,636,145 A | * | 6/1997 | Gorman et al. ............. | 340/441 |
| 5,644,288 A | * | 7/1997 | Kuroyanagi ................. | 340/441 |
| 5,761,074 A | * | 6/1998 | Nakamura .................... | 702/75 |
| 5,822,335 A | * | 10/1998 | Dannenberg ................. | 714/733 |
| 5,941,922 A | * | 8/1999 | Price et al. .................. | 701/51 |
| 5,969,224 A | * | 10/1999 | Ebara et al. ................. | 73/1.37 |

\* cited by examiner

Primary Examiner—Thomas G. Black
Assistant Examiner—Tuan C To
(74) Attorney, Agent, or Firm—Morgan Lewis & Bockius LLP

(57) ABSTRACT

The present invention relates to a device for converting vehicle speed signals characterized in that it includes a controller for converting vehicle speed signals which has a switch for controlling vehicle speed signals connected thereto and is mounted between a vehicle speed sensor and an electronic speedometer or tachometer. According to the present invention, it is possible to enhance the accuracy of measurement of vehicle speed, and to save separate costs for development of speed gear sets and simplify necessary specifications of a transmission.

13 Claims, 3 Drawing Sheets

DEVICE AND METHOD FOR CONVERTING VEHICLE SPEED SIGNALS

FIELD OF THE INVENTION

The present invention relates to a device for converting vehicle speed signals and a method therefore, and more particularly to such a device including a controller for converting vehicle speed signals regardless of tire radius or drive shaft reduction ratio.

BACKGROUND OF THE INVENTION

In general, an electronic speedometer or tachometer which displays the speed of a vehicle determines the speed by receiving a signal from a vehicle speed sensor mounted on an output shaft of the transmission. Such a vehicle speed sensor is usually a hall-type sensor and generates rectangular pulse signals when the vehicle runs.

Typically, a reference value is set so that a speedometer indicates 60 km/hour when the drive shaft rotates at 637 rpm. For example, if the vehicle speed sensor generates eight pulses per revolution, then the pulse number which is input to the speedometer or tachometer at 60 km/hour will be 5096 (8×637).

However, physical factors that influence the measurement of vehicle speed in such an arrangement include the final reduction ratio of the drive shaft, the loaded tire radius, and the gear ratio of the speed gear set that cooperates with the drive shaft and sensor. Depending on the model or type of vehicle, the final drive shaft reduction ratio and/or the loaded tire radius may vary, even for the same engine and the same transmission. Thus, the gear ratio of the speed gear set may need to be altered such that the drive shaft still rotates at 637 revolutions per minute at 60 km/hour. In this case, however, according to the conventional vehicle speed converting devices, the speed gear set must be newly designed and manufactured whenever the model or type of vehicle on which the device is utilized is changed. Such necessary changes cause an increase in costs for developing a new speed gear set, and may also require various specifications of the transmission to be changed, thus increasing maintenance costs.

SUMMARY OF THE INVENTION

Preferred embodiments of the invention include both a device and method for converting vehicle speed signals. In one embodiment of the device, a speed gear set is configured and dimensioned to be mounted between a drive shaft and a transmission of a vehicle. A vehicle speed sensor is connected to the speed gear set to generate pulse signals corresponding to a vehicle speed and transmit the signals to an electronic speedometer or tachometer. A controller programmed to convert vehicle speed signals communicates with a switch for controlling vehicle speed signals. The controller is electrically mounted between the vehicle speed sensor and the electronic speedometer or tachometer. Preferably, the switch controls the calculation by the controller of the pulse frequency per unit speed based on a designated speed.

In a further preferred embodiment, the controller is programmed to execute series of steps for converting the vehicle speed. These steps include at least storing in a memory factors specifying the vehicle and device characteristics, setting at least one of an input and an output reference pulse number based on the factors and on measured pulses, and calculating a number of pulses to be output to the electronic speedometer or tachometer.

A method according to an embodiment of the invention also includes at least the steps recited above. In one preferred embodiment, the storing comprises storing a loaded tire radius, a final reduction ratio of the drive shaft, a gear ratio of the speed gear set, and a number of pulses per revolution of the vehicle speed sensor. The setting and calculating preferably comprises a series of steps. These steps may include setting a reference input pulse number in a unit time per unit speed, setting a reference output pulse number per unit speed based on a specified output pulse number value, measuring pulse signals input from the vehicle speed sensor, calculating a vehicle speed by comparing the reference input pulse number with the number of pulses measured per unit time, calculating the number of pulses to be output per unit time at the calculated vehicle speed, and returning to measuring the number of pulses from the vehicle speed sensor after an output of pulse signals to an electronic speedometer or tachometer.

In an alternative preferred embodiment, the storing comprises storing a designated speed for controlling vehicle speeds. In this embodiment, the setting and calculating also comprises a series of steps. These steps include setting a reference output pulse number per unit speed on the basis of a specified output pulse number value and detecting whether the switch for controlling vehicle speed signals is "ON". Depending on the switch setting, further steps are performed. For example, if the switch for controlling vehicle speed signals is "ON", steps of measuring pulse signals which are input from the vehicle speed sensor, setting a reference input pulse number per unit speed, and then detecting whether the switch for controlling vehicle speed signals is set to be in a state of the reference input pulse number as it is in an "OFF" state are performed. If the switch is not set to be the reference input pulse number, process flow returns to the step of detecting a state of the switch for controlling vehicle speed signals. If the switch for controlling vehicle speed signals is set to be the reference input pulse number, steps of measuring pulse signals or the number of pulses which are input from the vehicle speed sensor, calculating a vehicle speed by comparing the number of pulses measured and the reference input pulse number, calculating the number of pulses (frequency) to be output per unit time at the calculated vehicle speed, and returning to the step of detecting a state of the switch for controlling vehicle speed signals after an output of pulse signals to an electronic speedometer or tachometer are performed. Preferably the specified output pulse number value is 637 rpm at 60 km/hour.

BRIEF DESCRIPTION OF THE DRAWINGS

The accompanying drawings, which are included to provide a further understanding of the invention and are incorporated in and constitute a part of this specification, illustrate an embodiment of the invention and together with the description and claims serve to explain the principles of the invention.

In the drawings.

DETAILED DESCRIPTION OF THE PREFERRED EMBODIMENTS

Reference will now be made in detail to preferred embodiments of the present invention in conjunction with accompanying drawings.

Figure 1:
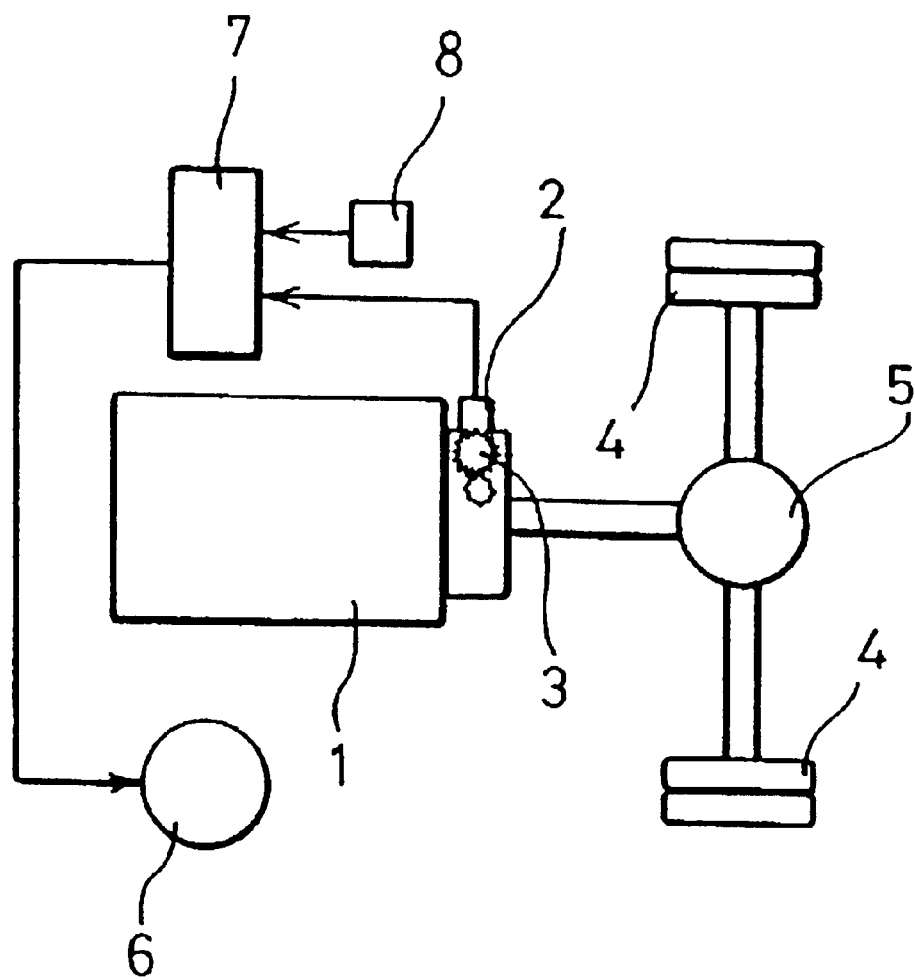
FIG. 1 is a block diagram showing a device for converting vehicle speed signals according to the present invention.

As shown in FIG. 1, a device for converting vehicle speed signals according to an embodiment of the present invention comprises a speed gear set 3 mounted between drive shaft 5 and transmission 1. An electronic speedometer or an electronic tachometer 6 receives signals from vehicle speed sensor 2, which is connected to speed gear set 3 for generating pulse signals corresponding to the vehicle speed. A controller 7 communicates with the vehicle speed sensor 2 and the electronic speedometer or tachometer 6. Controller 7 preferably comprises a suitable processor and memory, as well as other associated hardware and software as may be selected by a person of ordinary skill in the art to permit the controller to convert speed signals in accordance with the teachings herein. Switch 8, as explained in greater detail below, communicates with controller 7 to control vehicle speed signals communicated to controller 7.

Figure 2:
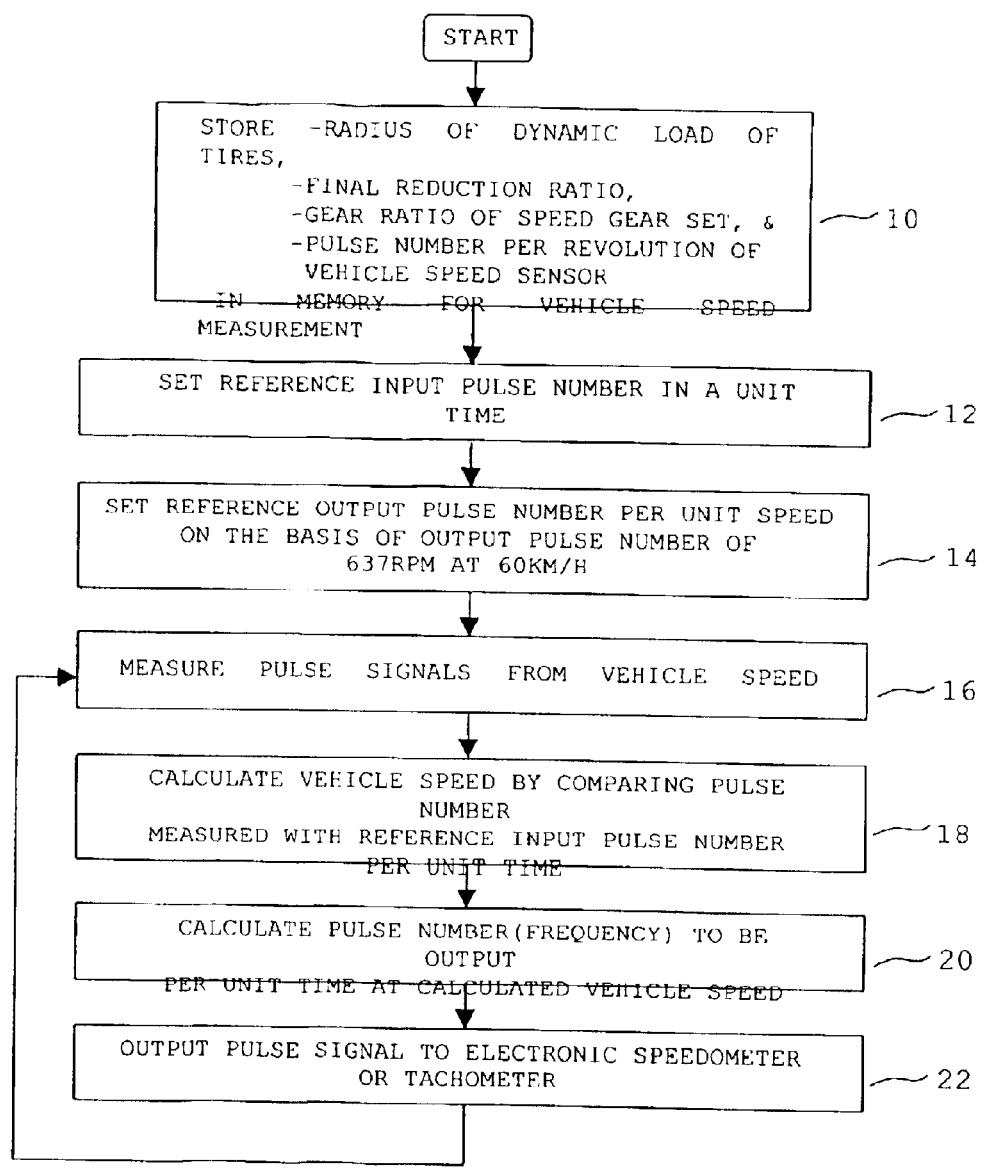
FIG. 2 is a flow chart illustrating a method for converting vehicle speed signals according to a preferred embodiment of the present invention.
Figure 3:
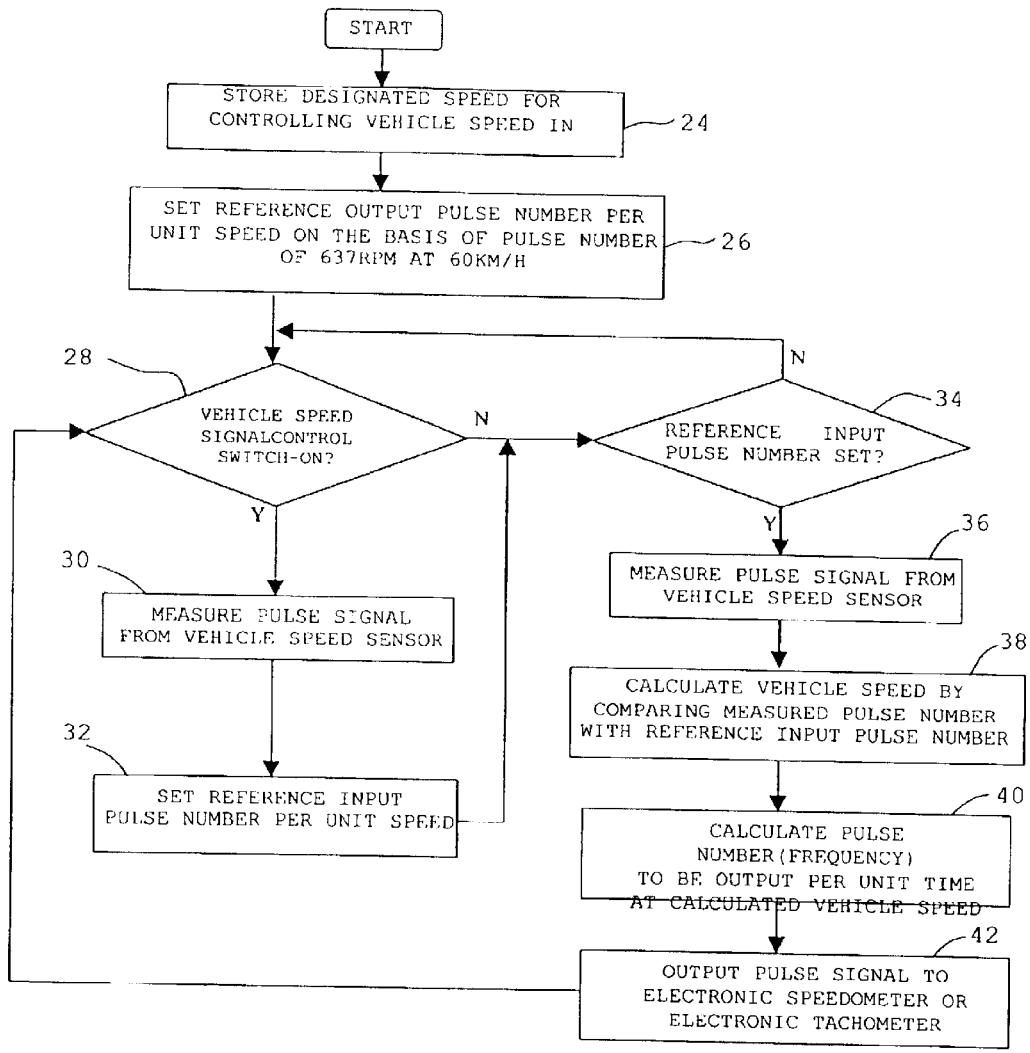
FIG. 3 is a flow chart illustrating a method for converting vehicle speed signals according to another preferred embodiment of the present invention.

When a vehicle employing the present invention moves, a speed signal is generated by the vehicle speed sensor 2 and input to the controller 7. The frequency of the signal increases or decreases in proportion to the vehicle speed. In this regard, there are at least two alternative methods for accurate determination of vehicle speed by controller 7. In a first method, as shown in FIG. 2, various factors required for calculation of vehicle speed, such as the radius of loaded tires 4, the final reduction ratio of the drive shaft 5, the gear ratio of the speed gear set 3, and the pulse number per revolution from the vehicle speed sensor 2, are stored in the memory in the controller 7. According to another method, as shown in FIG. 3, switch 8 for controlling vehicle speed signals is operated while the wheels rotate at a predetermined speed. The frequency of the signal which is output from the vehicle speed sensor 2 at the predetermined speed is stored. Then, a vehicle speed is obtained in proportion to the frequency on the basis of the stored value.

Therefore, regardless of the loaded tire radius or the final reduction ratio of the drive shaft, signals from the vehicle speed sensor, which is mounted on the output shaft of the transmission, are input to the controller for converting vehicle speed signals, where the signals from the vehicle speed sensor are converted on the basis of the signal of 637 rpm precisely at 60 km/hour, and the converted signal is output to the electronic speedometer or tachometer.

In first control method illustrated by reference to FIG. 2, controller 7 is programmed to execute a series of steps as described below. Factors for determining speed, such as the loaded tire radius, a final reduction ratio of the drive shaft, a gear ratio of the speed gear set, and the number of pulses per revolution of the vehicle speed sensor, are stored in memory at step 10. These are at least some of the factors for measurement of vehicle speed. A reference input pulse number in a unit time per unit speed is set at 12. A reference output pulse number per unit speed is then set at step 14 on the basis of an output pulse number of 637 rpm at 60 km/hour. Pulse signals, or the number of pulses input from the vehicle speed sensor, are measured at 16. Vehicle speed is calculated at 18 by comparing the reference input pulse number with the number of pulses measured per unit time. Next, the number of pulses (frequency) to be output per unit time at the previously calculated vehicle speed is calculated at step 20. Then, appropriate pulse signals are output at step 22 to an electronic speedometer or tachometer. Thereafter, the process returns to monitoring the number of pulses from the vehicle speed sensor at step 16.

In step 12, the reference input pulse number (kph sec) is preferably calculated according to the formula:

$$K = 2\pi R_w \times (1/R_a) \times (3600/1000) \times R_s \times (1/N_p) \quad (1)$$

where $R_w$ = loaded tire radius $R_a$ = final reduction ratio $R_s$ = speed gear ratio $N_p$ = pulses per revolution Vehicle speed may then be calculated according to the formula:

$$V = N_m (1/\text{sec}) \times K \quad (2)$$

where $N_m$ equals the number of pulses measured per unit time.

As is known in the art, speedometers require a specification for signal input. For example, a speedometer may recognize 60 km/hr for 637 revolutions in one minute. In addition, the number of pulses required to recognize one revolution may vary, for example as one revolution equal to 4, 8 or 16 pulses. Thus, depending on the speedometer specified and reference valve output, the controller can calculate the output reference value at step 14.

The number of pulses calculated and output at steps 20 and 22 may be determined according to the formula:

$$N_{out} = V \times K_p \quad (3)$$

where

V = calculated vehicle speed $K_p = (1/60 \text{ kph}) \times 4 \times 637 \text{ rpm} \times (1/60)$ The values 4 and 637 rpm represent exemplary speedometer specifications as discussed above and will vary depending on the equipment.

Referring to FIG. 3, an alternative method for converting vehicle speed signals according to the present invention is described. First, a designated speed for controlling the vehicle speed calculation is stored in memory at step 24. A reference output pulse number per unit speed is set at step 26 on the basis of an output pulse number of 637 rpm at 60 km/hour. Controller 7 then detects whether switch 8 for controlling vehicle speed signals is "ON" at step 28. If switch 8 is "ON," pulse signals input from the vehicle speed sensor are measured at step 30, and a reference input pulse number per unit speed is set at step 32. The controller 7 then verifies whether the reference input pulse number has been set at step 34. If the reference input pulse number has not been set at step 34, controller 7 returns to detecting the state of switch 8. When switch 8 is turned on, with the tire rotation at a designated speed (e.g., 30 kph, 40 kph . . . ), the number of pulses per unit time and per unit speed, which is the frequency per unit second, can be calculated by controller 7. The designated speed is stored in the controller memory.

Alternatively, if at step 34 controller 7 determines that the switch for controlling vehicle speed signals is set to be the reference input pulse number, a number of additional steps are performed. First, pulse signals or the number of pulses which are input from the vehicle speed sensor are measured at step 36. Next, vehicle speed is calculated by comparing the number of pulses measured and the reference input pulse number at step 38. The number of pulses (frequency) to be output per unit time at the calculated vehicle speed are calculated at step 40. Finally, the pulse signal is output at step 42 to an electronic speedometer or tachometer. Thereafter, controller 7 returns to the step of detecting the state of the switch for controlling vehicle speed signals.

In this embodiment, the reference output pulse number is calculated as explained above. Here, the reference input number is calculated according to the formula:

$$K = V_{ref}/N_m \quad (4)$$

where $V_{ref}$=a designated speed stored in memory $N_m$=the number of pulses measured per unit second At step 40, the pulse number to be output may be calculated by substituting the vehicle speed into equation (3) as explained above.

As described above, according to the present invention, since it becomes possible for controller 7 to output a signal corresponding to 637 rpm precisely at 60 km/hour that is converted from the signal of the vehicle speed sensor, regardless of the loaded tire radius or the final reduction ratio of the drive shaft, the accuracy of measurement of vehicle speed is enhanced while saving the development cost for speed gear sets, and various specifications of the transmission can be simplified.

It will be apparent to those skilled in the art that various modifications and variations can be made to the device and method of the present invention without departing from the spirit and scope of the invention. The present invention covers the modifications and variations provided they come within the scope of the appended claims and their equivalents.

What is claimed is:

1. A device for converting vehicle speed signals, comprising:
   a speed gear set configured and dimensioned to be mounted between a drive shaft and a transmission of a vehicle;
   a vehicle speed sensor connected to the speed gear set to generate pulse signals corresponding to a vehicle speed and transmitting said signals to an electronic speedometer or tachometer; and
   a controller programmed to convert vehicle speed signals communicating with a switch for controlling vehicle speed signals, said controller being electrically mounted between the vehicle speed sensor and the electronic speedometer or tachometer,
   wherein said switch controls calculation by the controller of the pulse frequency per unit speed based on a designated speed, and
   wherein the controller is programmed to execute steps comprising
      storing in a memory factors specifying the vehicle and device characteristics,
      setting at least one of an input and an output reference pulse number based on said factors and on measured pulses, and
      calculating a number of pulses to be output to the electronic speedometer or tachometer.

2. A method for converting vehicle speed signals in a vehicle having a drive shaft, a speed gear set and a speed sensor, the method comprising:
   storing in a memory factors specifying the vehicle and device characteristics;
   setting at least one of an input and an output reference pulse number based on said factors and on measured pulses; and
   calculating a number of pulses to be output to the electronic speedometer or tachometer.

3. The method of claim 2, wherein:
   said storing comprises storing a loaded tire radius, a final reduction ratio of the drive shaft, a gear ratio of the speed gear set, and a number of pulses per revolution of the vehicle speed sensor; and
   said setting and calculating comprises:
      setting a reference input pulse number in a unit time per unit speed;
      setting a reference output pulse number per unit speed based on a specified output pulse number value;
      measuring pulse signals input from the vehicle speed sensor;
      calculating a vehicle speed by comparing the reference input pulse number with the number of pulses measured per unit time;
      calculating the number of pulses to be output per unit time at the calculated vehicle speed; and
      returning to measuring the number of pulses from the vehicle speed sensor after an output of pulse signals to an electronic speedometer or tachometer.

4. The method of claim 3, wherein the reference input pulse number is calculated according to the formula $$K = 2\pi R_W \times (1/R_a) \times (3600/1000) \times R_s \times (1/N_p)$$

where

K=reference input pulse number $R_W$=loaded tire radius $R_a$=final reduction ratio $R_s$=speed gear ration $N_p$=pulses per revolution.

5. The method of claim 4, wherein the vehicle speed is calculated according to the formula $$V = Nm \times K$$

where

V=vehicle speed $N_m$=number of pulses measured per unit time.

6. The method of claim 5, wherein the number of pulses to be out put per unit time is calculated according to the formula:

$$N_{out} = V \times K_p$$

where $N_{out}$=number of pulses to be output per unit time $K_p$=(1/60 kph)×(a specified number of pulses corresponding to one revolution)×(the specified reference pulse number value)×(1/60).

7. The method of claim 6, wherein the specified output pulse number value is 637 rpm at 60 km/hour.

8. The method of claim 6, wherein the specified number of pulses corresponding to one revolution is 4.

9. The method of claim 2, wherein:
   said storing comprises storing a designated speed for controlling vehicle speeds; and
   said setting and calculating comprises:
      setting a reference output pulse number per unit speed on the basis of a specified output pulse number value;
      detecting whether a switch for controlling vehicle speed signals is "ON";

if the switch for controlling vehicle speed signals is "ON", measuring pulse signals which are input from the vehicle speed sensor, and setting a reference input pulse number per unit speed, and then detecting whether the reference input pulse number is set corresponding to the state of the switch for controlling vehicle speed signals is "OFF";

if the reference input pulse number is not set, returning to the step of detecting a state of the switch for controlling vehicle speed signal; and if the reference input pulse number is set, if the switch is not set to be the reference input pulse number, returning to the step of detecting a state of the switch for controlling vehicle speed signals; and if the switch for controlling vehicle speed signals is set to be the reference input pulse number, measuring pulse signals or the number of pulses which are input from the vehicle speed sensor, calculating a vehicle speed by comparing the number of pulses measured and the reference input pulse number, calculating the number of pulses (frequency) to be output per unit time at the calculated vehicle speed, and returning to the step of detecting a state of the switch for controlling vehicle speed signals after an output of pulse signals to an electronic speedometer or tachometer.

10. The method of claim 9, wherein the reference input pulse number is calculated according to the formula:

$$K = V_{ref}/N_m$$

where

K=reference input pulse number $V_{ref}$=a stored designated speed $N_m$=number of pulses measured per unit second.

11. The method of claim 10, wherein the pulse number to be output is calculated according to the formula:

$$N_{out} = V \times K_p$$

where $N_{out}$=number of pulses to be output per unit time $K_p$=(1/60 kph)×(a specified number of pulses corresponding to one revolution)×(the specified reference pulse number value)×(1/60).

12. The method of claim 11, wherein the specified output pulse number value is 637 rpm at 60 km/hour.

13. The method of claim 11, wherein the specified number of pulses corresponding to one revolution is 4.

* * * * *